United States Patent Office 3,357,130
Patented Dec. 12, 1967

3,357,130
METHOD FOR PROTECTING PLANTS IN A SALT-CONTAINING ENVIRONMENT
Justin H. Reinhart, Jamesburg, N.J., assignor to Olin Mathieson Chemical Corporation, New York, N.Y., a corporation of Virginia
No Drawing. Filed Aug. 27, 1964, Ser. No. 392,582
1 Claim. (Cl. 47—58)

ABSTRACT OF THE DISCLOSURE

The improved method of protecting plants growing in a salt-containing environment comprises applying to the plants and their environment an effective amount of certain aryloxy carbinols, ketones and carbamates.

---

This invention relates to new methods for the growth of plants. More particularly, this invention relates to the protection of growing plants from the injurious effects of the presence of salt in the environment in which they are grown. Even more particularly, this invention relates to the treatment of plants with certain phenoxy compounds to protect the said plants from the injurious effect of salt in the irrigation water applied thereto.

Recently, a great deal of concern has been expressed over the impending shortage of fresh water for agricultural and industrial needs. To solve this problem, fresh water conversion processes have been developed to convert salt water to fresh water. Heretofore, this conversion process has been the only method of employing salt-containing water in the growth of plants.

It has now been found that salt-containing water can be employed directly in the irrigation of plants without experiencing injury to those plants. This may be accomplished by treating the plants and their environment with certain phenoxy compounds.

Among the compounds which may be employed for the purposes of this invention are included such compounds as 3-(o-chlorophenoxy)1,2-propanediol; 3-(o-tolyloxy)-1,2-propanediol; 3-(m-chlorophenoxy)1,2-propanediol; 1-(o-tolyloxy)-2-propanone; 2,3,4-trichlorophenoxyethoxyethoxy ethanol; 2,3,4-trichlorophenoxyethoxy ethanol; 2,3,4,5-tetrachlorophenoxyethoxy ethanol; 2,3-dichlorophenoxyethoxy-ethoxy ethanol; pentachlorophenoxyethoxyethoxy ethanol; 2,4,5-trichlorophenoxyethoxyethoxyethyl phenyl carbamate; and 2,4,5-trichlorophenoxyethoxyethyl phenyl carbamate.

It has been found that the most preferable method of application to the plants of the phenoxy compounds is by the dispersion of an aqueous solution thereof directly on the plants or in their immediate environment. The amount of the phenoxy compound which may be satisfactorily employed in the practice of this invention has been found to vary from about 2 gm. to about 5 gm. per gallon of water employed for dispersion on or around the plants. However, other methods of application of the phenoxy compounds are possible with like satisfactory results, for example, the phenoxy compounds may be dusted directly upon the plants and their environment. For these purposes formulations which will make available a concentration of the phenoxy compounds of from 400 p.p.m to 2000 p.p.m. may be employed. For these purposes the selected phenoxy compound may be dispersed in a substantial amount of a suitable extending agent.

In this disclosure and in the claim appended thereto, the term "dispersed" is used in its widest possible sense. When it is said that the compounds of this invention are dispersed, it mean that the particles may be molecular in size and held in true solution in a suitable solvent. It means further that the particle may be colloidal in size and dispersed through a liquid phase in the form of suspension or emulsions or in the form of particles held in suspension by wetting agents.

The term "dispersed" also means that the particles may be mixed with and spread throughout a solid carrier so that the mixture is in the form of powder or dust. The term "dispersed" also includes mixtures which are suitable for use as aerosols including solutions, suspensions or emulsions of the agents of this invention in a carrier such as Freon which boils below room temperature at ordinary pressure.

The term "extending agent" as used in this disclosure and in the appended claim, includes any and all of those agents in which the compounds of the instant invention are dispersed. It includes, therefore, the solvents of a true solution, the liquid phase of suspensions, emulsions or aerosols, and the solid phase of dust and powders.

It has been found that the compounds of this invention are active when dispersed in an extending agent at concentrations of 0.1% by weight or even lower. This concentration is effective when the dispersing agent is a liquid but it is preferred to use more concentrated mixtures when the dispersing agent is a solid. This is because liquid dispersions which are, of course, suitable for use as sprays give a more intimate contact with the plants than the solid dispersions and, therefore, lower concentrations are more effective with liquid dispersions.

There are a number of solvents which can be utilized for the preparation of solutions, suspensions or emulsions of the compounds of this invention.

If the active agents are to be applied as aerosols, it is convenient to dissolve them in a suitable solvent and to disperse the resulting solution in a liquid such as Freon which boils below room temperature. For such applications it is better to employ true solutions of the active agent although it is possible to employ suspensions or emulsions of the active agent.

For use as a powder or dust the active ingredients of this invention may be mixed with any of a number of extending agents either organic or inorganic in nature which are suitable for the manufacture of pulverulent preparations. In addition to mixing the ingredients directly, the active compounds of this invention may first be dissolved in a suitable solvent and the dry extending agents may be treated with the resulting solution so that after the solvent evaporates off, the active ingredient is effectively coated on the surface of the extending agent. The extending agents which may be employed include, for example, tricalcium phosphate, calcium carbonate, kaolin, bole, kieselguhr, talc, calcined magnesia, boric acid and others. Materials of vegetable origin such as powdered cork, powdered wood and powdered walnut shells are also useful. These mixtures may be used in the dry form or, by the addition of wetting agents, the dry powder can be rendered wettable by water so as to obtain stable aqueous dispersions suitable for use as sprays.

It has been found that the most satisfactory results are obtained when the active ingredient of this invention is present in an amount of from 0.05% to 5.0% by weight of the final composition, and optimally, in an amount of from 0.1 to 2.0% by weight of the final product.

The following examples are illustrative of the invention:

*Example 1*

Potted bean plants grown in vermiculite are watered daily with a nutrient solution which provides the elements required for growth. Seven to ten days after planting, 50 mls. of a 400 p.p.m. aqueous solution of 2,3,4-trichlorophenoxyethoxyethoxy ethanol are drenched into the vermiculite of half the bean plants. Beginning five days after chemical treatment, 1% sodium chloride is added to the nutrient solution employed for daily water. After seven to ten days of treatment with the sodium chloride solution, the plants treated with the 2,3,4-trichlorophenoxy-ethoxyethoxy ethanol are still alive and growing whereas the remaining untreated plants are dead.

Example 2

Tabulated below are the results of experiments conducted in accordance with the procedure set forth in Example 1 with other compounds of this invention.

TABLE 1

| Compound Employed | Percent Living Plants After Exposure to Salt | |
|---|---|---|
| | Untreated Plants | Treated Plants |
| 3-(o-Chlorophenoxy)-1,2-propanediol | 0 | 100 |
| 3-(o-Tolyloxy)-1,2-propanediol | 0 | 90 |
| 3-(m-Chlorophenoxy)-1,2-propanediol | 0 | 100 |
| 1-(o-Tolyloxy)-2-propanone | 0 | 100 |
| 2,3,4-trichlorophenoxyethoxyethoxy ethanol | 30 | 100 |
| 2,3,4,5-tetrachlorophenoxyethoxy ethanol | 30 | 100 |
| 2,3-dichlorophenoxyethoxyethoxy ethanol | 30 | 100 |
| Pentachlorophenoxyethoxyethoxy ethanol | 0 | 60 |
| 2,4,5-trichlorophenoxyethoxyethoxyethyl phenyl carbamate | 30 | 100 |
| 2,4,5-trichlorophenoxyethoxyethyl phenyl carbamate | 0 | 100 |

This invention may be variously otherwise embodied within the scope of the appended claim.

What is claimed is:

The method of protecting plants from the injurious effects of a salt-containing environment which comprises applying to said plants and their environment an effective amount of a compound selected from the group consisting of 3-(o-chlorophenoxy)-1,2-propanediol; 3-(o-tolyloxy)-1,2-propanediol; 3-(m-chlorophenoxy)-1,2-propanediol; 1-(o - tolyloxy) - 2 - propanone; 2,3,4 - trichlorophenoxyethoxyethoxy ethanol; 2,3,4 - trichlorophenoxyethoxy ethanol; 2,3,4,5 - tetrachlorophenoxyethoxy ethanol; 2,3 - dichlorophenoxyethoxyethoxy ethanol; pentachlorophenoxyethoxyethoxy ethanol; 2,4,5 - trichlorophenoxyethoxyethoxyethyl phenyl carbamate; 2,4,5 - trichlorophenoxyethoxyethyl phenyl carbamate.

References Cited

UNITED STATES PATENTS 3,107,993   10/1963   Schaeffer et al. _____ 71—2.3

JAMES O. THOMAS, Jr., *Primary Examiner.*